July 30, 1968     ERNEST CHU YEN     3,395,202
PIGMENT COMPOSITION FOR MARKING GELATIN CAPSULES
Filed June 14, 1963     2 Sheets-Sheet 1
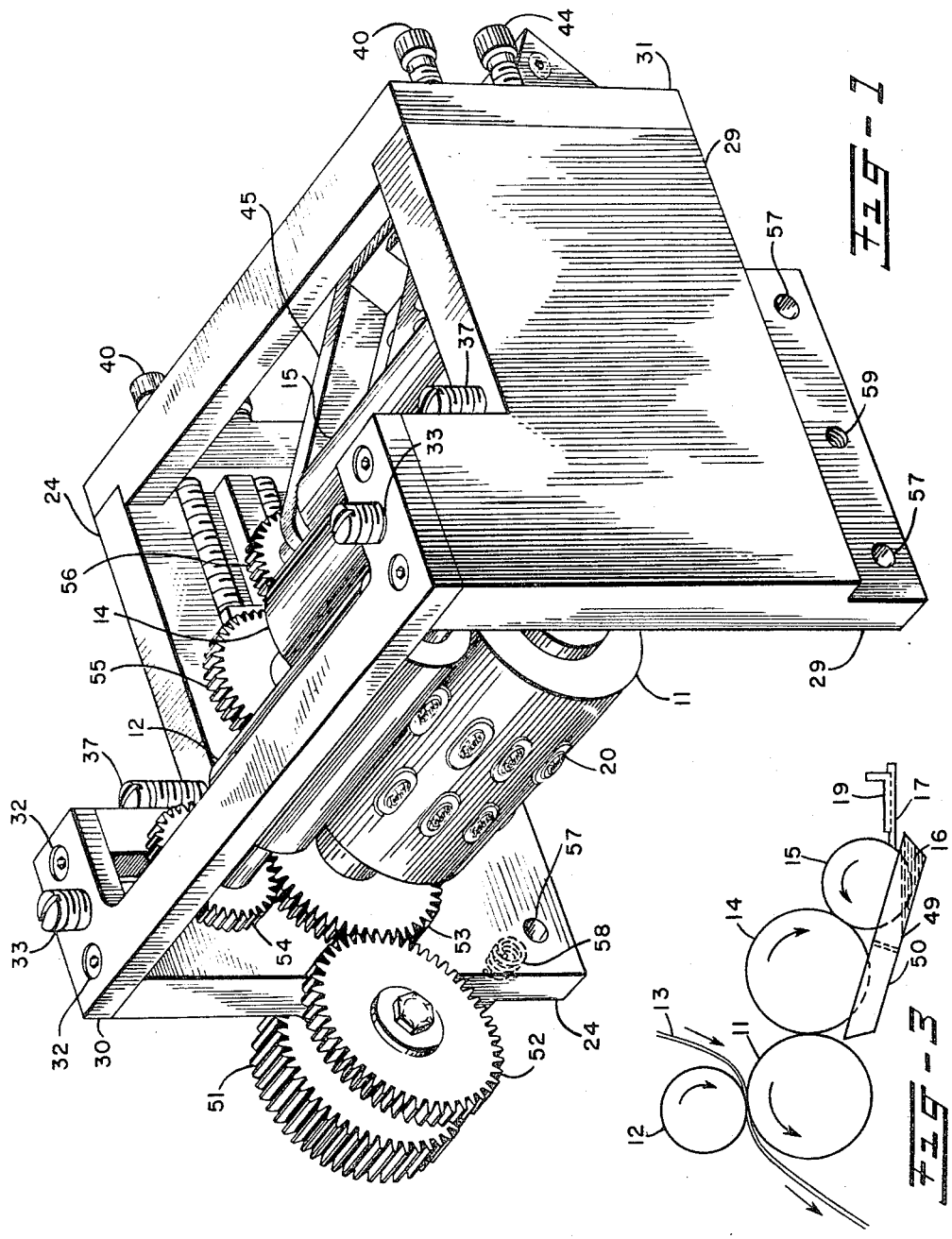
INVENTOR
ERNEST CHU YEN
BY
*Samuel Branch Walker*
ATTORNEY

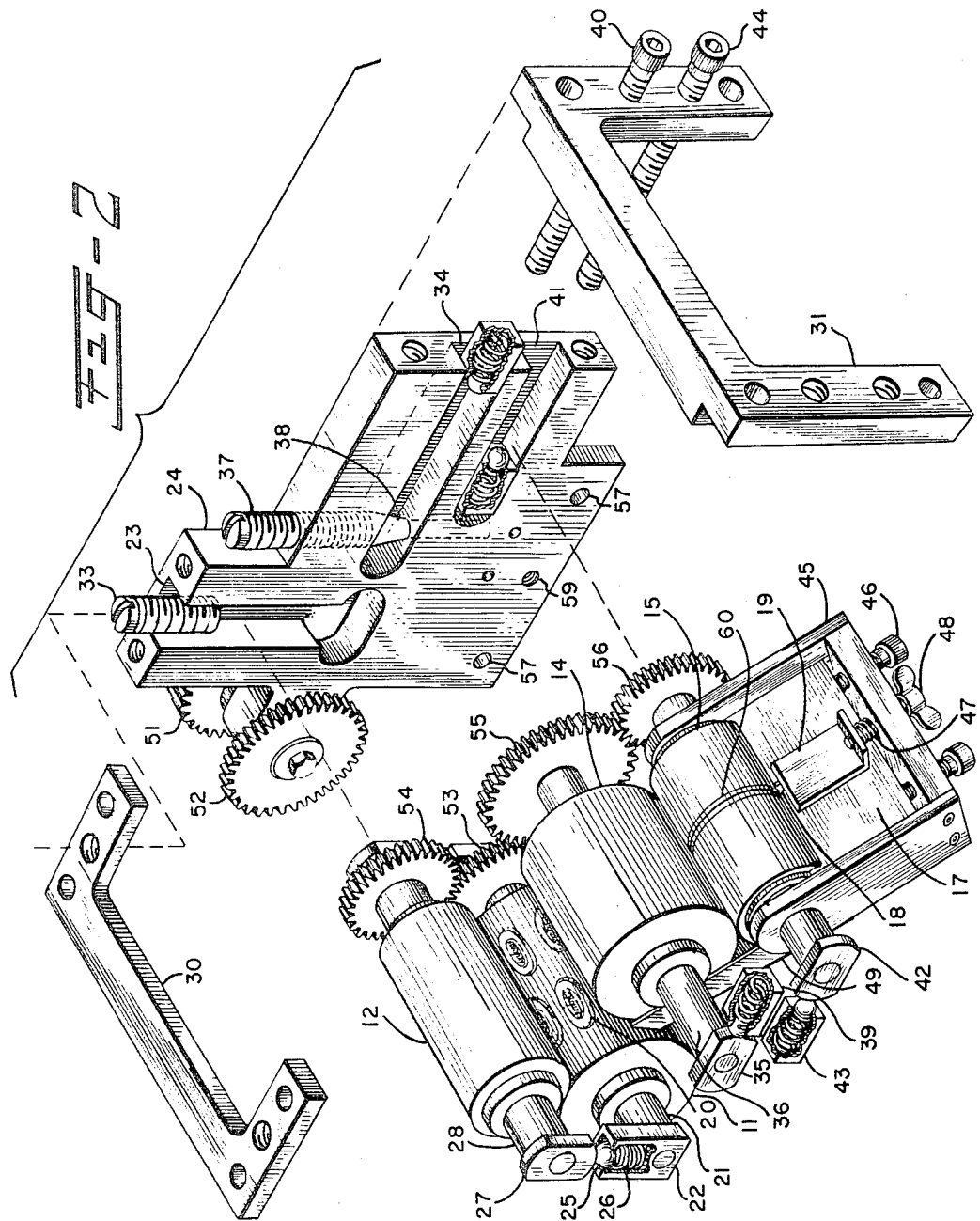

.# United States Patent Office 3,395,202
Patented July 30, 1968

3,395,202
PIGMENT COMPOSITION FOR MARKING GELATIN CAPSULES
Ernest Chu Yen, Orangeburg, N.Y., assignor to American Cyanamid Company, Stamford, Conn., a corporation of Maine
Filed June 14, 1963, Ser. No. 287,841
3 Claims. (Cl. 264—132)

This invention relates to a pigment composition or pigment fluid and a method of marking soft gelatin capsules therewith. The pigment containing marking fluid can be used on the gelatin strip before capsules are formed therefrom or may be used on soft shell capsules after the capsules are formed. Preferably an edible pigment is suspended in a water-polyhydric alcohol composition using methyl cellulose or sodium carboxymethyl cellulose as a binder.

In marking soft gelatin capsules, compositions have been used for marking on the surface of a gelatin strip with a dye before the strip is formed into capsules. One such embodiment is described in United States Patent 2,624,163, F. E. Stirn, "Method of Making Colored Gelatin Capsules," Jan. 6, 1953. A different marking composition is described in United States Patent 2,821,821, E. C. Yen, "Marking Gelatin Capsules," Feb. 4, 1958. A machine for applying marking fluid to strip gelatin to be used for making capsules is described in United States Patent 2,929,320, L. F. Hansen and R. Glorig, "Machine for Marking Capsules," Mar. 22, 1960.

The capsules themselves may be formed on a machine such as described in United States Patent 2,775,080, Stirn and Taylor, "Method of Filling Powder-and-Liquid Filled Capsules," Dec. 25, 1956, or United States Patent 2,697,317, Stirn and Taylor, "Capsule Forming Die Roll," Dec. 21, 1954.

The present invention may be used with such machines or with other machines for forming capsules and the composition may be used not only to mark on soft gelatin capsules during the process of their formation, but after the capsules are formed.

Dyes are conveniently used to mark on the surfaces of light-colored capsules but where the main body of the capsule itself is dark, a dye which has additional color is difficult to read and a sufficiently heavy dye impression may result in bleeding.

A new development in identification of capsules is marking of the capsules first on a colorless or white capsule and then surface dyeing the capsule with the marking showing through the surface coloring. For such a procedure, particularly if the capsule is to be colored a dark color, dyes give a dim impression. In the past, the use of pigments for surface marking has not been practical because of difficulties in commercial marking, including adhesion, pigment transfer, offsetting, and chipping of the pigment, and lack of a pigment printer which would mark without constant attention.

A soft gelatin strip before the capsules are made, must have a considerable portion of glycerine and water so that good sealing is obtained. After the capsules have been manufactured by cutting out the capsules from the gelatin strips the strips are still quite tender. To permit handling of the capsules after manufacture and before dyeing, it is necessary that the marking composition rapidly permeate and become affixed to the gelatin strip so that the marking does not unduly offset or bleed. If the capsules thus marked are to be additionally dyed, the marking must be compatible with the later dyeing composition. It is easy to find a composition which will have some of the desired attributes but a commercially-satisfactory pigment composition is more difficult to prepare. Because the dyes usually used for marking are soluble in a polyhydric alcohol-water system, a dye system used for marking easily penetrates and leaves the dye in the surface of the film, so that no dripping problem is involved. Additionally, dyes are soluble, and hence redissolve in the solvent system of choice and hence do not cake on the printing unit. Pigments are already solid particles, and hence remain on the surface of the capsule, and are more apt to chip off or offset, and are not readily resuspendable, and hence clog the printing unit.

It has now been found that an excellent marking composition consists of a suspension of a substantially water-insoluble non-toxic opaque material such as titanium dioxide, calcium carbonate or barium sulfate suspended in an aqueous vehicle containing a polyhydric alcohol such as glycerine, propylene glycol, ethylene glycol, liquid polyethylene glycol or sorbitol with a small amount of a non-toxic surface active agent to maintain the pigment in suspension and aid penetration into the film, and aid in smooth spreading on the marking type, and a water-soluble suspending and cellulose derivative adhesive agent such as methyl cellulose or sodium carboxymethyl cellulose. Titanium dioxide is the strongest, and usually preferred pigment.

Ethylene glycol is best used on capsules which are not ingested. Dyes, bleaches, etc. for non-medical uses are readily encapsulated and marked using ethylene glycol. Even though the residual quantity is very small, the non-toxicity of propylene glycol renders propylene glycol the polyhydric alcohol of choice. Additionally, the volatility characteristics of propylene glycol are within a preferred range.

A particularly useful embodiment consists of titanium dioxide, propylene glycol, water, methyl cellulose and bis(2-ethylhexyl)sodium sulfosuccinate (Aerosol OT®).

Such a composition leaves an imprint on a colored capsule which shows up readily and, additionally, leaves an imprint on the opaque, colorless or white gelatin film which clearly shows up when capsules made from such film are dyed.

Dyeing of the surface only of gelatin capsules has the dual advantage of reducing the consumption of dyestuffs, which are expensive, and reducing the amount of dyestuffs ingested by the user of the capsules. At least some dyestuffs which in the past have been considered non-toxic are becoming suspect as to toxicity when used in large quantities so that it appears desirable to reduce the quantity of all dyestuff used under all conditions to further minimize the possibility of undesirable effects from dyestuffs on allergic patients or others where a minimum quantity of a dye is desired.

The coloring of capsules is very useful for identification during manufacture, distribution, sale and final use. By having a mark that shows up through the surface coloring, additional identification as regards contents or origin, or both is possible and there is additional insurance against the possibility of confusion. All markng at the time of manufacture of the capsules guarantees against mismarking and saves labor costs.

One device satisfactory for marking gelatin strip before capsules are formed is shown in the accompanying drawings in which:

FIGURE 1 is a pictorial view of the assembled pigment printer.

FIGURE 2 is a pictorial exploded view of the pigment printer.

FIGURE 3 is a diagrammatic cross section of the roll system of the pigment printer.

As shown in FIGURE 3, the essential elements of the pigment printer include a marking roll 11, which corresponds to the printing roll of the more conventional printing couples; and adjacent thereto a pressure roll 12. Between these two rolls passes the gelatin strip 13. Adjacent to the marking roll 11, and bearing against raised portions of the marking roll, is the pigment marking fluid transfer and spreading roll 14, sometimes hereafter shortened to the transfer roll. In contact with the transfer roll is the pigment pick-up roll 15. The pigment pick-up roll, which rotates in the pigment marking fluid 16, bears against the transfer roll 14, and a notched doctor blade 17 doctors or scrapes the pigment marking fluid from the pigment pick-up roll except at the notch 18. The cross section of the notch is varied by the notch adjusting doctor 19.

Thus, a very narrow band of pigment marking fluid of adjustable cross section passes through the notch in the notched doctor blade and is spread over the surface of the transfer and spreading roll 14 as the pigment fluid passes between the bite of the transfer and spreading roll and the pigment pick-up roll, thus giving a uniform coating on the transfer and spreading roll which is transferred to the raised portions of the marking roll and thus to the gelatin strip being marked.

As shown in more detail in FIGURE 2, the marking roll 11 consists of a roll having integral or separate marking type 20 which are conveniently trademark or identification cuts having the design, indicia or letters to be printed on a soft gelatin strip 13. The marking roll 11 is mounted on the marking roll shaft 21 which is journaled at each end in a marking roll journal block 22. The rear marking roll journal block 22 slides in the marking roll slot 23 in the rear side plate 24. The marking roll journal block 22 has in its upper face a positioning ball 25 under which is a positioning ball spring 26.

Also sliding in the marking roll slot 23 is the pressure roll journal block 27. In the pressure roll journal block is journaled the pressure roll shaft 28 on which is mounted the pressure roll 12.

A corresponding front side plate 29 is on the front side of the assembly and of the same general configuration, except for the driven gear support. Both side plates are shown in FIGURE 1. The front side plate is omitted in FIGURE 2 to show the details of roll construction. The front and rear side plates are held apart by a top side plate spacer 30 and an end side plate spacer 31. The spacers are held to the side plates by spacer cap screws 32. Through the top side plate spacer extends a pressure roll adjusting screw 33 which bears on the pressure roll journal block 27 pressing the pressure roll towards the marking roll. The positioning ball 25 loaded by the positioning ball spring 26 tends to press the pressure and marking rolls apart, thus taking up any lost motion and permitting a very delicate adjustment of the spacing between the pressure roll 12 and the marking roll 11. Thus the pressure on the gelatin strip 13 passing therebetween is readily and accurately controlled. It is necessary that only minimum pressure be used as the gelatin strip is tender and easily damaged by pressure.

The side plates have therein, at approximately right angles to the marking roll slot 23, transfer roll slots 34, in which slides the transfer roll journal blocks 35 in which blocks is journaled the transfer roll shaft 36. At the end of the transfer roll slots, closest to the pressure roll, are conical tapered positioning screws 37. The transfer roll journal blocks 35 bear against the conical portions 38 of the positioning screws 37 and hence the entry depth of these blocks and the pressure between the transfer roll and the marking roll can be accurately controlled. Bearing against the transfer roll journal blocks are transfer roll balls and springs 39 which are compressed to increase pressure by transfer roll adjusting screws 40 threaded in the end side plate spacer 31.

Partially under and adjacent to, and conveniently parallel to, the transfer roll slots 34 are pigment pick-up roll slots 41 in which slots slide the pigment pick-up journal blocks 42, which in turn are urged backwards by the pick-up roll balls and springs 43 and which are pressed forward by the pick-up roll adjusting screws 44. The shaft of the pick-up roll 15 is journaled in said blocks 42. The spring loading of the blocks thus permits the use of the adjusting screws to give delicate control over pressures and any lost motion is taken up by spring action. The action of the journal blocks and adjusting assemblies are the same for both side plates.

Also journaled on the shaft of the pigment pick-up roll 15 is a doctor blade frame 45. In the doctor blade frame slides a notched doctor blade 17 which is held against the pigment pick-up roll 15 by the notched doctor adjusting screws 46. A notch adjusting doctor 19 slides on the surface of the notched doctor blade 17 and is urged towards the pigment pick-up roll by a biasing spring 47 and held open by a feed-adjusting screw 48.

Under the pigment pick-up roll 15 is a pigment marking fluid trough 49 holding a pigment marking fluid 16. Also in the trough is a spillage compartment 50 to pick up any marking fluid which is spilled during operation. A conventional fluid supply system is used to supply the pigment marking fluid to a constant level in the pigment marking fluid trough.

As shown in FIGURE 1, the shaft of each roll is gear driven. On the rear side plate only is mounted a wide driven gear 51 which is driven by an angularly adjustable gear on the encapsulation machine, the details of which are conventional. This is a spur gear which is wide enough so that the entire pigment marker assembly can be axially shifted for lateral register. An angularly adjustable drive gear on the encapsulating machine provides for linear register. The wide driven gear is fastened to a spur gear 52 which in turn drives the marking roll gear 53 which drives the pressure roll gear 54, and the transfer roll gear 55, which transfer roll gear drives the pigment pick-up roll gear 56.

In the lower part of the side plates are mounting holes 57 which permit the entire assembly to slide on mounting rods attached to the encapsulation machine so that the entire assembly may be axially adjusted for lateral register. Conveniently, the assembly is spring loaded in one direction by mounting springs 58 behind the assembly which is held against the spring action by an adjusting screw setting through an adjusting screw hole 59.

In operation the pigment printer assembly is mounted on the encapsulation machine so that the gelatin strip feeds between the marking roll 11 and the pressure roll 12 and the marking fluid composition is fed into the pigment fluid trough. The pigment fluid is picked up by the pigment pickup roll. Most of the fluid is scraped off of the pigment pick-up roll by the notched doctor so that only a narrow ribbon of pigment marking fluid 60 is fed on the surface of the pigment pick-up roll and into the bite between the pigment pick-up roll and the transfer and spreading roll. Because this ribbon is comparatively narrow, about 2 mm., the volume may be more readily controlled than if a wider feed were used. Thus, the amount of pigment marking fluid fed can be exactly adjusted to a desired rate so that as the fluid is evenly spread over the surface of the transfer and spreading roll, just enough is fed to properly mark the gelatin strip.

Marking machines such as disclosed in United States Patent 2,929,320, supra, which are satisfactory for soluble dye marking compositions do not feed sufficiently uniformly to give economical results with the present pigment marking fluids. If the marking fluid evaporates too rapidly the marking roll becomes caked and if it evaporates too slowly the marked capsules are damaged by offset or smearing. The exact rate of feed of the pigment marking fluid is critical as it must be sufficiently heavy to give an adequate print and yet not so heavy as to flake off from the finished capsules or remain in such a mass as to be slow drying; hence the unique cooperation between the above described marking apparatus and the marking fluid composition.

Although the material of construction is not critical for effective results, the pigment printer has a longer effective life if the pick-up roll is of a hard material such as stainless steel, or chrome-plated steel, and the pressure roll and transfer and spreading roll are of a resilient material, such as rubber or a synthetic rubber, which is not swelled by the pigment marking fluid.

The pigment printer thus described also gives good results with a pigment marking fluid containing both a soluble dye and a pigment.

Titanium dioxide is particularly useful as a pigment component for the pigment marking fluid composition because it is non-toxic and highly opaque. Calcium carbonate and barium sulfate are non-toxic and give a good mark if used in slightly larger quantities. Other white pigments can be used, if proved to be non-toxic, and even white lead can be used for marking products which are not for internal consumption.

The carrier for the pigment is a mixture of water and a non-toxic polyhydric alcohol. Propylene glycol is preferred because it has the characteristics of penetrating into the gelatin surface sufficiently rapidly that the marking composition hardens sufficiently to prevent offset during the formation of capsules from the strip and before their discharge from the encapsulation machine, which thus permits tumbling of the capsules immediately after formation. Such prompt tumbling aids in rounding powder-filled capsules and permits prompt coloration by a surface dye without storage problems, without inventory problems, with optimum ease of reusing web, and without the possibility of confusion between various batches of capsules. For best results, from about 30% to 60% of propylene glycol is preferred. The titanium dioxide gives excellent results in the range of from about 10 to 20% and the remainder is largely water.

About 0.5% to 3% of a suspending and binding agent is preferred. Methyl cellulose is the suspending agent of choice as it forms a film binding the pigment to the surface of the capsule which is flexible and sufficiently hard without being brittle and is thus both rub resistant and chip resistant. Low viscosity methyl cellulose is preferred. A methoxyl content of from 20% to 32% gives good results. Sodium carboxymethyl cellulose and other water-soluble non-toxic adhesive cellulose derivatives give good results.

A water-soluble non-toxic wetting agent increases the rate of penetration into the surface of the gelatin strip and improves the bond. Non-toxic wetting agents such such as polyoxyethylene sorbitan monooleate, polyoxyethylene-polyoxy propylene condensation polymers (Pluronic F–68) sodium lauryl sulfate and polyoxyethylene stearate give good results. Sodium bis(2-ethylhexyl)sulfosuccinate is preferred. Sodium bis(2-ethylhexyl)sulfosuccinate is well known to have extremely low toxicity and has long been used as a laxative. The quantities in the capsule are too small to have an appreciable laxative effect but even with a dose of thousands of times that which would be ordinarily ingested with the capsules, this wetting agent is known to be non-toxic and comparatively innocuous. A concentration of about 0.05% of the wetting agent is preferred. A range of at least 0.005 to 1% is effective. The exact quantity varies in part with the state of subdivision of the pigment, and the degree of agitation and time of storage before use. Sufficient agent to maintain suspension, and give a rapid penetration in the film and give smooth non-puddling spreading on the type is preferred.

A current list of wetting agents is given in an article by John W. McCutcheon, "Synthetic Detergents and Emulsifiers—Up to Date III," Soap and Chemical Specialties, July, August, September and October 1955. This lists is expanded in "Detergents and Emulsifiers 1963 Annual," John W. McCutcheon, Inc., 236 Mount Kemble Ave., Morristown, N.J., 1963. The surfactants here listed can be used for suspension of the pigments, but where toxicity is a problem, only those known to be non-toxic are acceptable. Rather than prove non-toxicity of some other surfactant, some form of bis(2-ethylhexyl) sulfosuccinic acid, such as its sodium salt, or polyoxyethylene sorbitan monooleate or polyoxyethylene stearate or other agent known to be non-toxic is usually used commercially.

Where desired, other non-toxic pigments, including iron oxides, charcoal, and the insoluble lakes of toxicologically approved dyes may be used independently or in combination with titanium dioxide. One group of dyes is described in "The Application Properties of Certified Coal Tar Colors" by William Peacock, American Cyanamid Company, Bound Brook, N.J. (1944). For use as pigments, these dyes are conveniently converted to an insoluble lake using conventional procedures.

Among the pigments presently approved for internal consumptive use in the United States are those described in the article entitled "Colors For Food, Drugs and Cosmetics," published in the Encyclopedia of Technology, the Interscience Encyclopedia, Inc., 1949, vol. 4, pages 287–313. This encyclopedia describes the production and sale of various colors, giving the name and formula for both the Food, Drug and Cosmetic dyes which are insoluble colors and their lakes, such as on a substratum of alumina or other non-toxic substrate, which thus converts the dye to an insoluble lake, which in finely divided form is a satisfactory pigment for use in coloring the surface of capsules. This list includes colors approved for drug and cosmetic use. Obviously, for capsules not for ingestion, toxicity of the pigments is not a problem, but by far the most common use of pigments for identified capsules is in the pharmaceutical industry for ingestion, and here non-toxic colors are required, and in the United States, those already approved for use by the Food and Drug Administration are usually used to avoid the cost and time involved in securing approval of additional colors. Carmine is a suitable pigment from natural sources.

After approval as to toxicity other pigments can be added to the list for internal consumption.

After marking and drying, the capsules can be coated by the process of United States Patent 2,727,833, Yen and Stirn, "Capsule Finishing Process."

Whereas there are numerous variations in the ratios of the components of this invention, as set forth in the appended claims, the following examples show representative operative embodiments. In accordance with the usual pharmaceutical practice, all parts are by weight unless otherwise clearly specified.

EXAMPLE 1

48 parts of titanium dioxide pigment are mixed with 72 parts of propylene glycol and passed through a three-roller paint mill until the pigment is smoothly dispersed. Separately 5 parts of low viscosity methyl cellulose are dispersed by stirring in 200 parts of hot water; 2 parts of a 10% aqueous solution of sodium bis(2-ethylhexyl) sulfosuccinate are added and the mixture is cooled to room temperature. It is then mixed with the titanium dioxide dispersion in propylene glycol. 55 additional parts of propylene glycol are added and the mixture is stirred until a smooth uniform suspension is obtained.

When used with the pigment printer above described, the marking composition is smoothly transferred onto the printing surface and transferred by conventional letterpress type to the surface of a gelatin strip from which capsules are being formed.

As soon as the capsules are formed in the encapsulation machine and are stripped from the residual web, the capsules are picked up by an air conveyor and transferred to tumbling drums where they are tumbled together until the drum is filled to its operating level. The drum is then replaced and the capsule-containing drum is rotated during subsequent dyeing or lubricating procedures, and then the capsules are spread out in a tray in a dry room to attain final dryness. Excellent results are obtained in printing letters, instructions, trade marks and other insignia on the surface of gelatin capsules. The main body of the capsule can be colored before or after the pigment printing. If colored first, the pigment printing shows up as a clear white. If dyed after printing, the printing is tinted, but lighter than the body of the capsule.

EXAMPLE 2

48 parts of titanium dioxide are mixed with 72 parts propylene glycol and passed through a three-roller paint mill to thoroughly disperse the titanium dioxide in the propylene glycol and wet the pigment particles. Separately 5 parts of methyl cellulose are stirred into 100 parts of hot water to which is added 4 parts of a 10% aqueous solution of sodium bis(2-ethylhexyl) sulfosuccinate and the composition stirred while being cooled to room temperature, after which it is transferred to the titanium dioxide-propylene glycol mixture and an additional 95 parts of propylene glycol are added, and the composition stirred until a uniform suspension is obtained. Uniform lines are obtained in printing with this composition on conventional soft gelatin strips prior to the manufacture of capsules therefrom.

EXAMPLE 3

48 parts of FD&C Blue No. 1 lake (a commercially available triphenyl methane blue lake) are mixed with 72 parts of propylene glycol and passed through a three-roller paint mill until the lake is uniformly dispersed through the propylene glycol. 6 parts of a low viscosity methyl cellulose are stirred into 100 parts of hot water to which are added 5 parts of a 10% aqueous solution of sodium bis(2-ethylhexyl) sulfosuccinate and the composition stirred while being cooled to room temperature. The two compositions are blended together and an additional 100 parts of propylene glycol are added and the composition stirred until uniform.

When placed in the printing machine, above described, a uniform blue pigment print is obtained on the surface of the capsules. The pigment shows a minimum of offset and the capsules may be tumble dried.

The depth of color may be reduced by using some titanium dioxide instead of all FD&C Blue No. 1 lake.

Satisfactory results are obtained when printing upon each of a colorless gelatin strip, a white gelatin strip containing only titanium dioxide as a colorant and a gray gelatin strip containing both titanium dioxide and charcoal as colorants. The capsules from any of these strips give satisfactory uniform coloration over the surface of the capsule when tumble dyed by placing the capsules in a rotating drum and adding a small quantity of a non-toxic dye dissolved in a 50% ethanol 50% water solution. The amount of dye in the solution and the amount of solution used may be varied over wide limits, depending upon the depth of coloration desired. For instance, a small amount of a blue such as FD&C Blue No. 1 will give a light blue capsule with dark blue printing when used with an otherwise white gelatin capsule.

The white gelatin capsules with the blue marking may be dyed using a small amount of FD&C Red No. 4 dissolved in a 50-50 mixture of isopropanol and water. Depending upon the amount of dissolved dye and the amount added in the tumble dyeing process, the surface of the capsules may be colored from a barely discernible pink to a full dark red. The tumble dyeing gives a uniform coloration with the consumption of less dye than is required if the gelatin strip itself is dyed.

EXAMPLE 4

Example 3 is repeated using medium viscosity sodium carboxymethyl cellulose instead of methyl cellulose. Similar results are obtained.

EXAMPLE 5

The procedure of Example 2 is repeated substituting 75 parts of calcium carbonate instead of the 48 parts of titanium dioxide.

Elegantly printed capsules are obtained.

EXAMPLE 6

The procedure of Example 1 is repeated using the same quantities of glycerine instead of propylene glycol.

Well printed capsules are obtained.

EXAMPLE 7

48 parts of powdered charcoal are mixed with 72 parts of polyethylene glycol having a molecular weight of about 600 and passed through a three-roller paint mill until the pigment is uniformly dispersed through the polyethylene glycol. 6 parts of methyl cellulose are stirred into 100 parts of hot water to which is added 1 part of polyoxyethylenepolyoxypropylene condensate (Pluronic F–68®) and the composition stirred while being cooled to room temperature. The two compositions are blended together and an additional 100 parts of polyethylene glycol are added and the composition stirred until uniform.

When placed in the printing machine, above described, a uniform black pigment print is obtained on the surface of the capsules.

I claim:
1. A method of forming pigment marked edible soft gelatin capsules having pigmented indicia on the surface which comprises: suspending from 10 to 20 parts of a non-toxic water and alcohol insoluble pigment selected from the group consisting of titanium dioxide, calcium carbonate, barium sulfate, charcoal, iron oxides and the lakes of dyes approved for drug and cosmetic use, in 30 to 60 parts of a polyhydric alcohol selected from the group consisting of propylene glycol, polyethylene glycol and glycerine and sufficient water to make a total of 100 parts with the aid of 0.005 to 1 part of a non-toxic surface active suspending agent in the presence of from about 0.5 to 3 parts of a water-soluble non-toxic cellulose derivative selected from the group consisting of methyl cellulose and sodium carboxymethyl cellulose, applying the thus formed pigment marking fluid to a wet soft gelatin strip, forming gelatin capsules from said strip, and thereafter drying the pigment marked capsules.

2. A method of forming pigment marked edible soft gelatin capsules having pigmented indicia on the surface which comprises: suspending from 10 to 20 parts of a non-toxic water and alcohol insoluble pigment in 30 to 60 parts of a polyhydric alcohol and sufficient water to make a total of 100 parts with the aid of 0.005 to 1 part of a non-toxic surface active suspending agent in the presence of from about 0.5 to 3 parts of a water-soluble non-toxic cellulose derivative, applying the thus formed pigment marking fluid to a wet soft gelatin strip, forming gelatin capsules from said strip, and thereafter drying the pigment marked capsules.

3. A method of forming pigment marked edible soft gelatin capsules having pigmented indicia on the surface which comprises: suspending from 10 to 20 parts of titanium dioxide in 30 to 60 parts of propylene glycol and sufficient water to make a total of 100 parts with the aid of 0.005 to 1 part of sodium bis(2-ethylhexyl)sulfosuccinate in the presence of from about 0.5 to 3 parts of a water-soluble methyl cellulose, applying the thus formed pigment marking fluid to a wet soft gelatin strip, forming gelatin capsules from said strip, and thereafter drying the pigment marked capsules.

(References on following page)

References Cited

UNITED STATES PATENTS

| | | | |
|---|---|---|---|
| 1,087,843 | 2/1914 | Smith | 167—83 |
| 2,183,948 | 12/1939 | Wallach et al. | 264—132 |
| 2,693,436 | 11/1954 | Spradling | 106—193 |
| 2,816,061 | 12/1957 | Doer et al. | 167—82 |
| 2,948,626 | 8/1960 | Sanders | 106—24 |
| 3,043,747 | 7/1962 | Long | 167—82 |
| 2,821,821 | 2/1950 | Chu Yen | 101—149.1 |

JAMES A. SEIDLECK, *Primary Examiner.*

J. B. EVANS, *Assistant Examiner.*